United States Patent
Sawyers-Abbott

(10) Patent No.: US 10,060,292 B2
(45) Date of Patent: Aug. 28, 2018

(54) CASTELLATED LATCH MECHANISM FOR A GAS TURBINE ENGINE

(71) Applicant: United Technologies Corporation, Hartford, CT (US)

(72) Inventor: Nigel David Sawyers-Abbott, South Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 344 days.

(21) Appl. No.: 14/774,168

(22) PCT Filed: Mar. 13, 2014

(86) PCT No.: PCT/US2014/025191
§ 371 (c)(1),
(2) Date: Sep. 10, 2015

(87) PCT Pub. No.: WO2014/197057
PCT Pub. Date: Dec. 11, 2014

(65) Prior Publication Data
US 2016/0032779 A1    Feb. 4, 2016

Related U.S. Application Data

(60) Provisional application No. 61/783,076, filed on Mar. 14, 2013, provisional application No. 61/839,066, filed on Jun. 25, 2013.

(51) Int. Cl.
*B64D 29/08* (2006.01)
*F01D 25/26* (2006.01)
(Continued)

(52) U.S. Cl.
CPC ........... *F01D 25/265* (2013.01); *B64D 29/06* (2013.01); *B64D 29/08* (2013.01); *F01D 15/10* (2013.01);
(Continued)

(58) Field of Classification Search
CPC ........... F01K 1/80; F01K 1/805; B64D 29/06; B64D 29/08; B64D 27/26; B64D 27/262;
(Continued)

(56) References Cited

U.S. PATENT DOCUMENTS

| 4,145,877 A | 3/1979 | Montgomery |
| 4,549,708 A | 10/1985 | Norris |

(Continued)

OTHER PUBLICATIONS

European Search Report for EP Application No. 14807092.3 dated Oct. 18, 2016.
(Continued)

*Primary Examiner* — Gerald L Sung
*Assistant Examiner* — Rene Ford
(74) *Attorney, Agent, or Firm* — Carlson, Gaskey & Olds, P.C.

(57) ABSTRACT

A gas turbine engine includes a fan duct including a fan duct inner structure that surrounds a core engine, a fan case that surrounds a fan, a core engine frame, and at least one mechanism configured to secure a portion of the fan duct inner structure to a portion of the core engine frame. The at least one mechanism includes a castellated arcuate portion mounted to one of the fan duct inner structure and the core engine frame and an inwardly projecting retaining feature mounted to the other of the fan duct inner structure and the core engine frame. The castellated arcuate portion is rotatable about an engine central longitudinal axis to position a feature of the castellated arcuate portion proximate to a portion of the inwardly projecting retaining feature to latch the fan duct inner structure.

22 Claims, 8 Drawing Sheets

(51) Int. Cl.
  *B64D 29/06* (2006.01)
  *F01D 25/28* (2006.01)
  *F02K 1/72* (2006.01)
  *F02C 7/20* (2006.01)
  *F01D 25/24* (2006.01)
  *F01D 15/10* (2006.01)
  *F02C 3/04* (2006.01)
  *F02K 1/80* (2006.01)

(52) U.S. Cl.
  CPC ........... *F01D 25/246* (2013.01); *F01D 25/28* (2013.01); *F02C 3/04* (2013.01); *F02C 7/20* (2013.01); *F02K 1/72* (2013.01); *F02K 1/805* (2013.01); *F02K 1/80* (2013.01); *F05D 2220/32* (2013.01); *F05D 2250/182* (2013.01); *F05D 2250/71* (2013.01); *F05D 2260/36* (2013.01)

(58) Field of Classification Search
  CPC .. F01D 25/243; F01D 25/246; F05D 2260/30; F02C 7/20
  See application file for complete search history.

(56) References Cited

U.S. PATENT DOCUMENTS

| | | | |
|---|---|---|---|
| 5,183,223 A * | 2/1993 | Cornax | F02C 7/20 244/54 |
| 5,224,342 A | 7/1993 | Lair | |
| 5,603,471 A * | 2/1997 | Armstrong | B64D 29/00 239/265.31 |
| 6,976,352 B2 | 12/2005 | Lair | |
| 7,007,488 B2 | 3/2006 | Orlando et al. | |
| 7,025,385 B2 * | 4/2006 | Drescher | F16L 37/252 285/330 |
| 7,146,796 B2 | 12/2006 | Lair | |
| 7,264,203 B2 | 9/2007 | Lair | |
| 8,186,938 B2 | 5/2012 | Young et al. | |
| 8,220,738 B2 | 7/2012 | Calder et al. | |
| 2005/0039438 A1 | 2/2005 | Lair | |
| 2005/0102996 A1 | 5/2005 | Lair | |
| 2005/0151012 A1 | 7/2005 | Lair | |
| 2006/0239814 A1 | 10/2006 | Uwami et al. | |
| 2008/0098720 A1 | 5/2008 | Watson | |
| 2009/0071122 A1 | 3/2009 | Maguire et al. | |
| 2010/0051112 A1 * | 3/2010 | Dieling | F02C 7/04 137/15.1 |
| 2010/0148012 A1 | 6/2010 | McDonough et al. | |
| 2013/0052005 A1 | 2/2013 | Cloft | |
| 2013/0227962 A1 * | 9/2013 | Bunel | F01D 25/243 60/796 |
| 2015/0345333 A1 * | 12/2015 | Dubois | B64D 29/06 415/214.1 |

OTHER PUBLICATIONS

International Preliminary Report on Patentability for International Application No. PCT/US2014/025191 dated Sep. 24, 2015.
International Search Report and Written Opinion for International Application No. PCT/US2014/025191 dated Dec. 22, 2014.

* cited by examiner

CASTELLATED LATCH MECHANISM FOR A GAS TURBINE ENGINE

BACKGROUND OF THE INVENTION

This disclosure relates to a castellated latch mechanism for a thrust reverser of a gas turbine engine.

A gas turbine engine typically includes a nacelle surrounding an engine core. Portions of the nacelle can be latched to one another and to the engine itself. A gas turbine engine also typically includes a fan case surrounding a fan. The nacelle can also be latched around the fan case and to the engine core. Latch mechanisms keep the nacelle and the gas turbine engine from separating due to various load conditions, including high pressures generated by the gas turbine engine. The latch mechanism may, however, need to be released for on-the-ground maintenance.

Additional latch mechanisms may be required to act closer to the engine core and resist significant deflection due to a high pressure line rupture in the engine core compartment. Currently, gas turbine engines include latch mechanisms for this event that are manually operated and can be actuated by cables, rods, or other physical devices. Due to the remote location of the latches relative to a handle in the gas turbine engine, it can be difficult to actuate the latch mechanisms and to confirm their successful closure.

SUMMARY OF THE INVENTION

A gas turbine engine according to an exemplary embodiment of this disclosure, among other possible things includes a fan duct including a fan duct inner structure that surrounds a core engine, a fan case that surrounds a fan, a core engine frame, and at least one mechanism configured to secure a portion of the fan duct inner structure to a portion of the core engine frame. The at least one mechanism includes a castellated arcuate portion mounted to one of the fan duct inner structure and the core engine frame and an inwardly projecting retaining feature mounted to the other of the fan duct inner structure and the core engine frame. The castellated arcuate portion is rotatable about an engine central longitudinal axis to position a feature of the castellated arcuate portion proximate to a portion of the inwardly projecting retaining feature to latch the fan duct inner structure.

In a further embodiment of any of the foregoing gas turbine engines, the castellated arcuate portion is mounted to the core engine frame and the inwardly projecting retaining feature is mounted to the fan duct inner structure.

In a further embodiment of any of the foregoing gas turbine engines, the feature is a tab. The inwardly projecting retaining feature includes an inwardly projecting stem and a hook having an outwardly facing surface. The castellated arcuate portion is rotatable about the engine central longitudinal axis to position the tab outwardly of the outwardly facing surface of the hook to latch the fan duct inner structure.

In a further embodiment of any of the foregoing gas turbine engines, the castellated arcuate portion is a single component.

In a further embodiment of any of the foregoing gas turbine engines, the castellated arcuate portion extends approximately 360° about the engine central longitudinal axis.

In a further embodiment of any of the foregoing gas turbine engines, includes two castellated arcuate portions each including a feature, and each of the two castellated arcuate portions extend about 0° to about 180° about the engine central longitudinal axis.

In a further embodiment of any of the foregoing gas turbine engines, the castellated arcuate portion is manually rotatable.

In a further embodiment of any of the foregoing gas turbine engines, includes a handle with a cable that is at least indirectly attached to the castellated arcuate portion. Actuation of the handle rotates the castellated arcuate portion about the engine central longitudinal axis.

In a further embodiment of any of the foregoing gas turbine engines, includes a motor that is configured to rotate the castellated arcuate portion.

In a further embodiment of any of the foregoing gas turbine engines, the motor is one of an electric motor, pneumatic motor, a fueldraulic motor, and a hydraulic motor.

In a further embodiment of any of the foregoing gas turbine engines, the castellated arcuate portion includes multiple components.

In a further embodiment of any of the foregoing gas turbine engines, the castellated arcuate portion is static and the inwardly projecting retaining feature is moveable relative to the castellated arcuate portion to latch the fan duct inner structure.

A gas turbine engine according to an exemplary embodiment of this disclosure, among other possible things includes a fan duct including a fan duct inner structure that surrounds a core engine, a fan case that surrounds a fan, a core engine frame, and at least one latch mechanism configured to secure a portion of the fan duct inner structure to a portion of core engine frame. The at least one latch mechanism includes a castellated arcuate portion mounted to the core engine frame and an inwardly projecting retaining feature mounted to the fan duct inner structure. The inwardly projecting retaining feature includes a hook having an outwardly facing surface. The castellated arcuate portion is rotatable about an engine central longitudinal axis to position a castellated feature of the castellated arcuate portion outwardly of the outwardly facing surface of the hook to latch the fan duct inner structure. The castellated feature is a tab.

In a further embodiment of any of the foregoing gas turbine engines, the castellated arcuate portion extends approximately 360° about the engine central longitudinal axis.

In a further embodiment of any of the foregoing gas turbine engines, includes two castellated arcuate portions each including a feature, and each of the two castellated arcuate portions extend about 0° to about 180° about the engine central longitudinal axis.

In a further embodiment of any of the foregoing gas turbine engines, the castellated arcuate portion is manually rotatable.

In a further embodiment of any of the foregoing gas turbine engines, includes a handle with a cable that is at least indirectly attached to the castellated arcuate portion. Actuation of the handle rotates the castellated arcuate portion about the engine central longitudinal axis.

In a further embodiment of any of the foregoing gas turbine engines, includes a motor that is configured to rotate the castellated arcuate portion.

In a further embodiment of any of the foregoing gas turbine engine, the motor is one of an electric motor, pneumatic motor, a fueldraulic motor, and a hydraulic motor.

In a further embodiment of any of the foregoing gas turbine engine, the castellated arcuate portion includes multiple components.

These and other features can be best understood from the following specification and drawings, the following of which is a brief description.

DETAILED DESCRIPTION OF THE PREFERRED EMBODIMENTS

Figure 1:
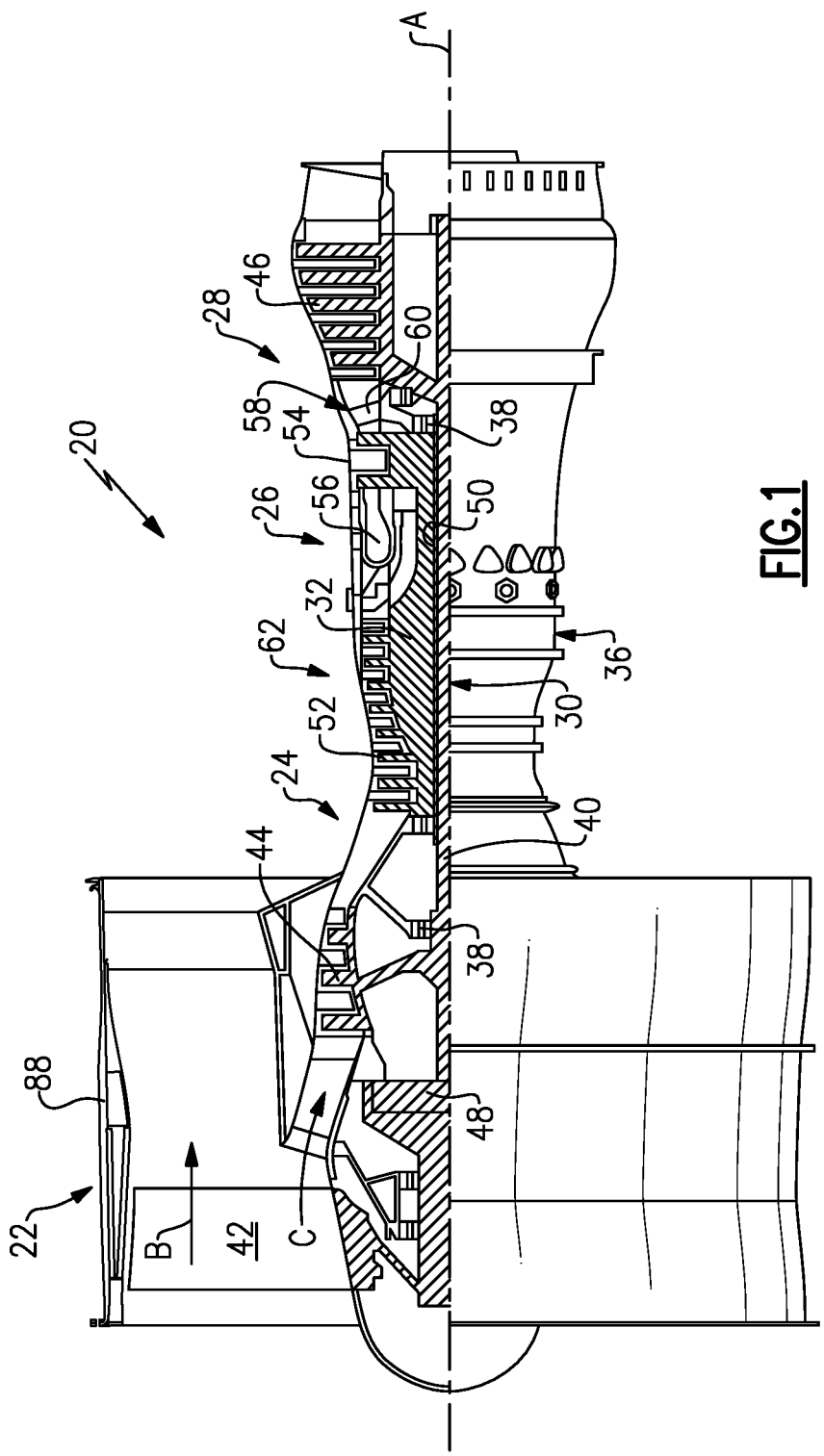
FIG. 1 illustrates a schematic gas turbine engine propulsion system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22, the compressor section 24, and the combustor section 26 are collectively known as a core engine 62. Alternative engines might include an augmentor section (not shown) among other systems or features. The fan section 22 drives air along a bypass flow path B in a bypass duct defined within a fan case 88 inside a nacelle 34 (shown in FIG. 2), while the compressor section 24 drives air along a core flow path C for compression and communication into the combustor section 26 then expansion through the turbine section 28. Although depicted as a two-spool turbofan gas turbine engine 20 in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The high pressure turbine 54 and the low pressure turbine 46 rotationally drive the respective low speed spool 30 and high speed spool 32 in response to the expansion. It will be appreciated that each of the positions of the fan section 22, compressor section 24, combustor section 26, turbine section 28, and the geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 in one example is a high-bypass geared aircraft engine. In a further example, the gas turbine engine bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in feet/second divided by an industry standard temperature correction of $[(Tram \,°\, R)/(518.7° R)]^{0.5}$. The "Low corrected fan tip speed" as disclosed herein according to one non-limiting embodiment is less than about 1150 feet/second.

Figure 2:
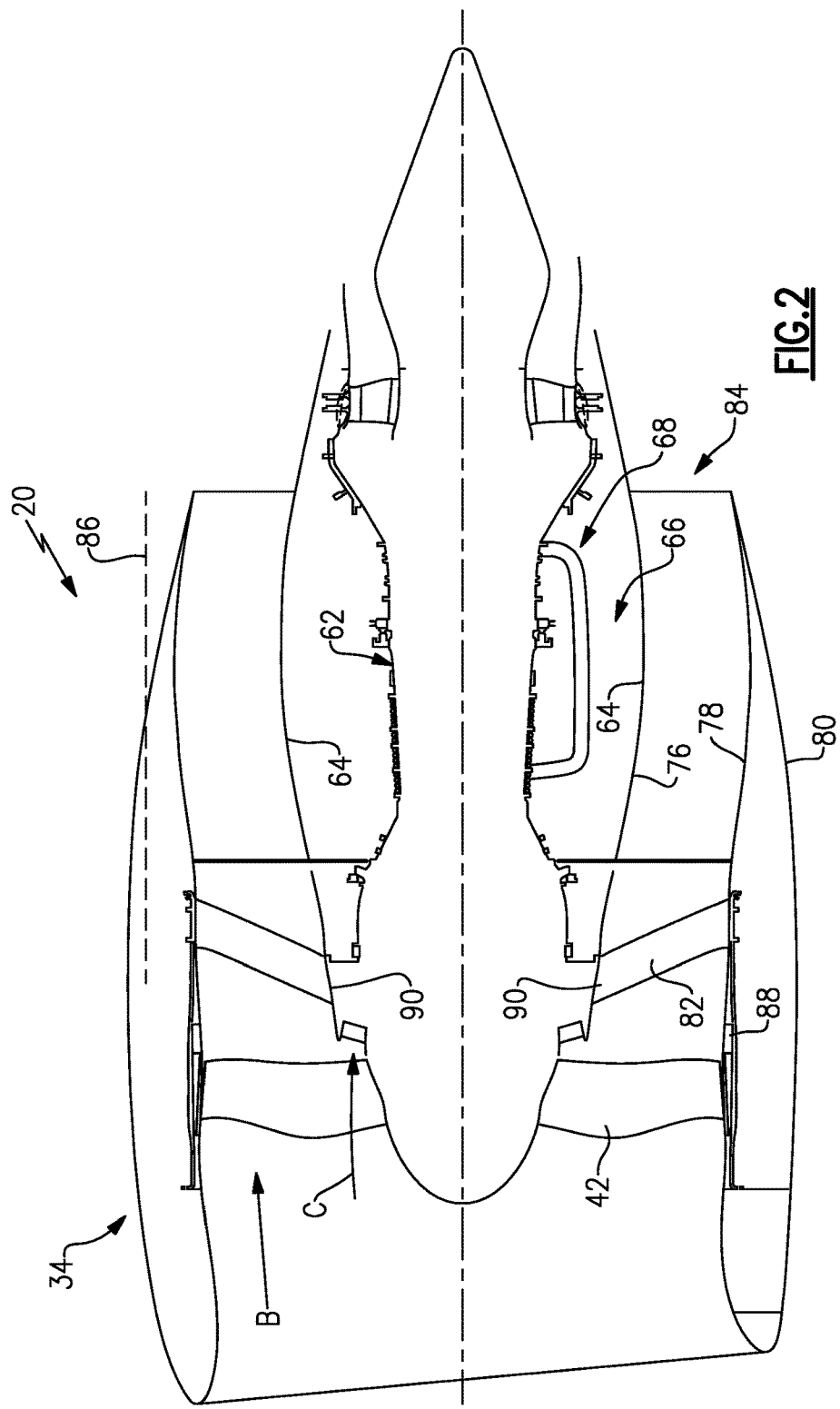
FIG. 2 illustrates an embodiment of a simplified schematic gas turbine propulsion system.

Referring to FIG. 2, a fan duct inner structure 64 surrounds the core engine 62 and encloses a core compartment 66. Various components may be provided in the core compartment 66, such as fluid conduits, for example, or a compressed air duct 68. The compressed air duct 68 is under high pressure and may supply compressed air from the low pressure compressor 44 or the high pressure compressor 52 to the high pressure turbine 54 for cooling, for example. Or the compressed air duct 68 can supply compressed air for an airframe Environmental Control System (ECS). The bypass flowpath B is provided by an inner flow surface 76 and an outer flow surface 78.

Figure 3A:
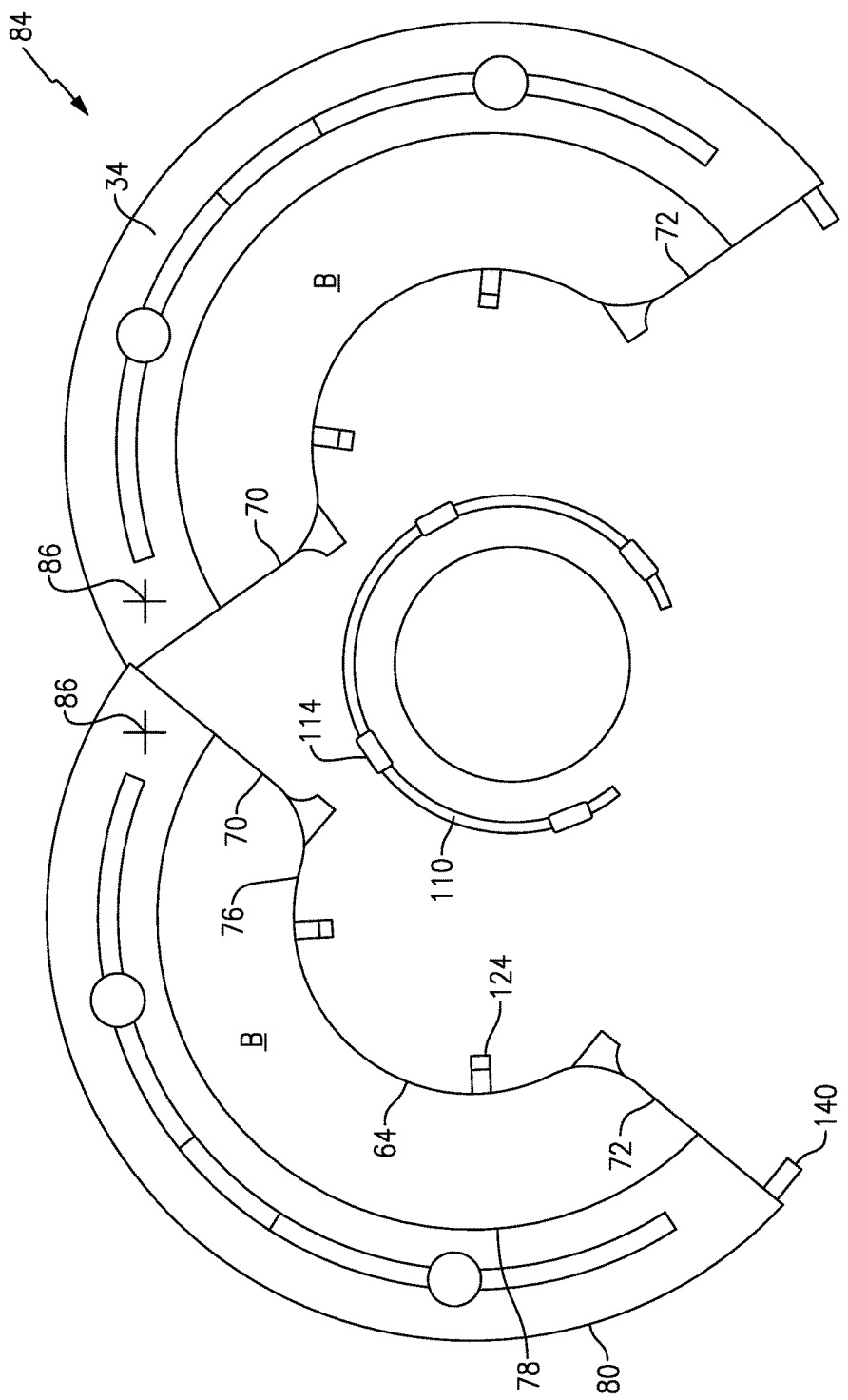
FIG. 3a illustrates a cross section of the schematic gas turbine engine propulsion system embodiment of FIG. 2 with the fan duct in an open position.
Figure 3B:
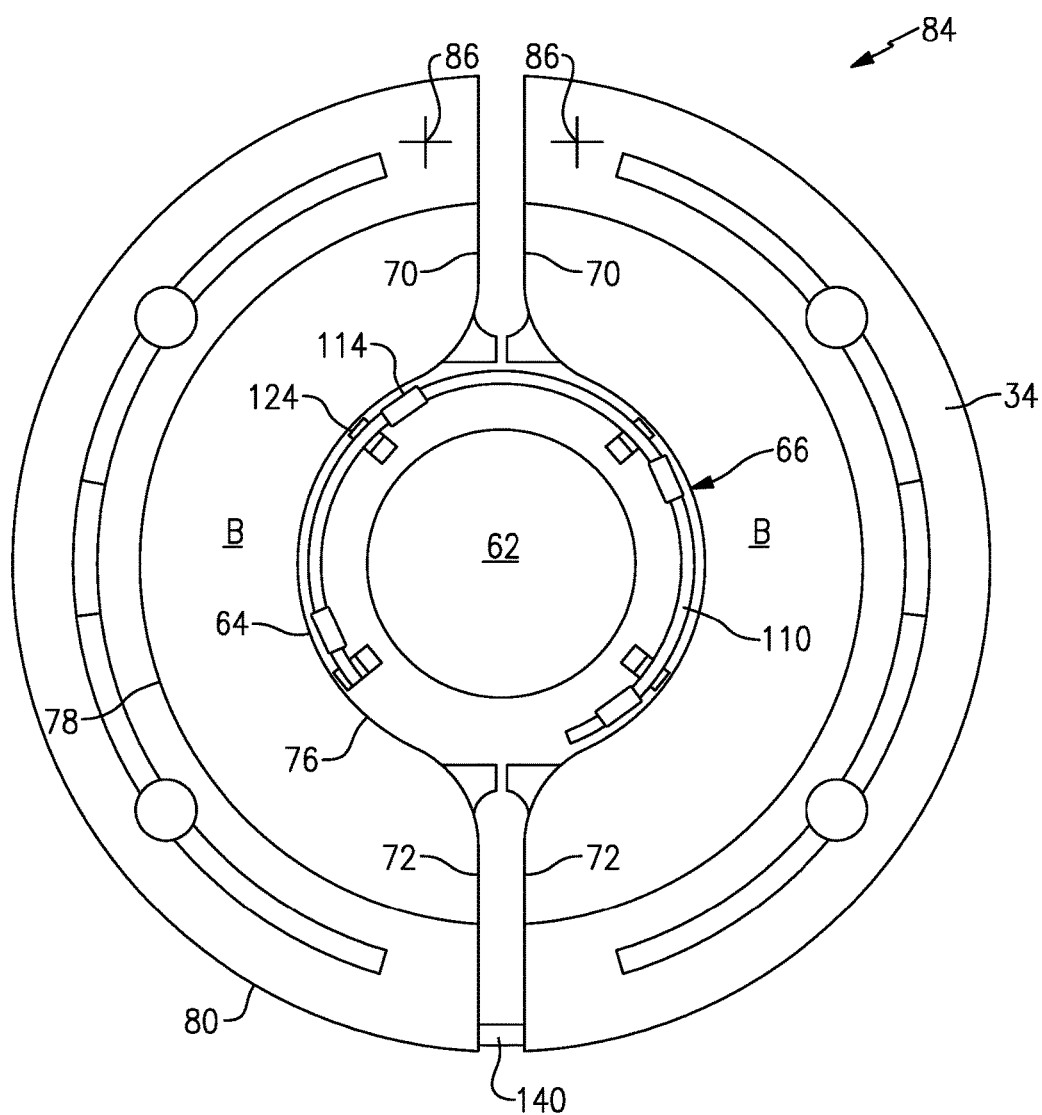
FIG. 3b illustrates a cross section of the schematic gas turbine engine propulsion system embodiment of FIG. 2 with the fan duct in a closed position and a castellated arcuate portion in a disengaged position.
Figure 3C:
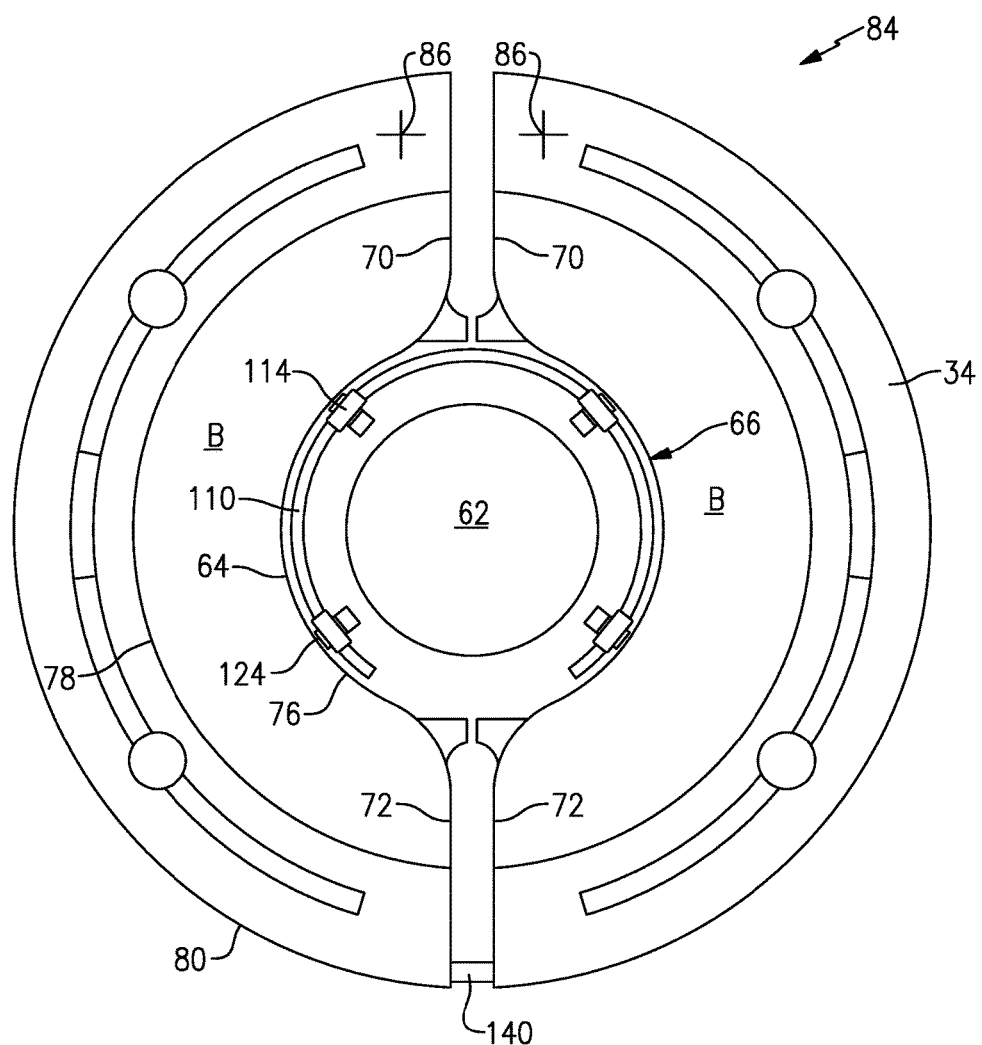
FIG. 3c illustrates a cross section of the schematic gas turbine engine propulsion system embodiment of FIG. 2 with the fan duct in the closed position and the castellated arcuate portion rotated to an engaged position.

Referring to FIGS. 3a, 3b and 3c, with continued reference to FIG. 2, in some nacelle 34 configurations, an upper bifurcation 70 and a lower bifurcations 72 may extend radially in the bypass flowpath B in locations opposite one another to accommodate wires, fluid conduits, engine mountings, or other components.

A portion of the nacelle 34 that is aft of fan exit guide vanes 82 (shown in FIG. 2) includes the fan duct inner structure 64, the upper bifurcation 70, and the lower bifurcation 72, which together define a fan duct 84. The fan duct 84 opens on fan duct hinge lines 86 to allow access to the core compartment 66 of the gas turbine engine 20 for maintenance or engine removal and replacement.

Figure 4A:
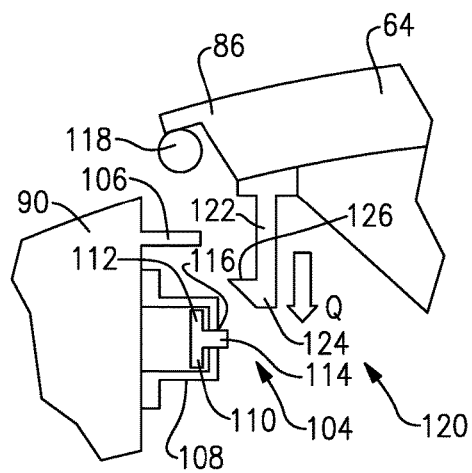
FIG. 4a illustrates an embodiment of a schematic latch mechanism that secures a fan duct to a core engine frame when the fan duct is in the open position.
Figure 4B:
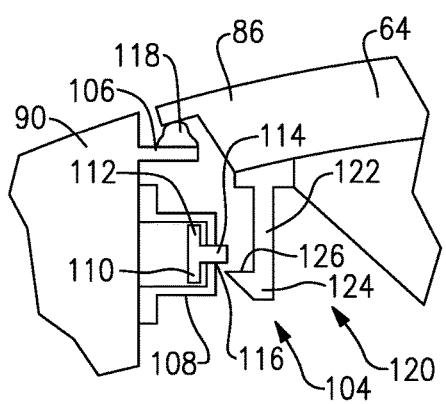
FIG. 4b illustrates the embodiment of the schematic latch mechanism when the fan duct is in the closed, but unlatched, position.
Figure 4C:
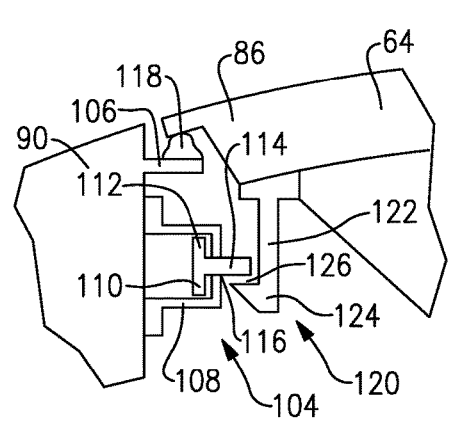
FIG. 4c illustrates the embodiment of the schematic latch mechanism in the closed and latched position.

As shown in FIGS. 4a, 4b, 4c and 4d, one or more latching mechanisms 104 can secure portions of a core engine frame 90 and the fan duct inner structure 64 to one another. The latching mechanisms 104 mitigate the loads/deflections induced by a burst event caused by high pressure air in the core compartment 66. FIGS. 4a, 4b, 4c and 4c show a cross-sectional view of the latching mechanism 104, and these features extend circumferentially around the engine central longitudinal axis A. Emergency release is possible by a set of fasteners (not shown) mounted on a fan flow side of the fan duct inner structure 64.

The core engine frame 90 includes a seal land 106 and a support frame 108 that supports a castellated arcuate portion 110. The castellated arcuate portion 110 is mounted to the core engine frame 90. As shown in FIGS. 5a and 5b, the castellated arcuate portion 110 includes a body portion 112 and at least one castellated feature 114 (for example, a tab). Returning to FIGS. 4a, 4b, 4c and 4d, the body portion 112 is rotated inside the support frame 108, and the castellated feature 114 projects from an opening 116 in the support frame 108.

The fan duct inner structure 64 includes an inwardly projecting retaining feature 120. A seal 118 is attached to an inner surface of the fan duct 84. The inwardly projecting retaining feature 120 includes an inwardly projecting stem 122 and a hook 124 including an outwardly facing surface 126. In another embodiment, the axial positions of the seal 118 and the inwardly projecting retaining feature 120 can be switched.

FIGS. 3a and 4a illustrate the fan duct 84 in an open position, and a portion of the fan duct inner structure 64 is located outwardly of the core engine frame 90. When the fan duct 84 is to be closed, the fan duct inner structure 64 is moved inwardly in the direction Q by rotation around the fan duct hinge line 86. At this time, each hook 124 does not engage a corresponding castellated feature 114.

FIGS. 3b and 4b illustrate the fan duct 84 in a closed, but not latched, position, after the fan duct inner structure 64 has been moved in the direction Q from the position of FIG. 4a. The seal 118 is compressed between the fan duct inner structure 64 and the seal land 106 of the core engine frame 90 to provide sealing of the core compartment 66. In this position, the hook 124 does not engage the castellated feature 114 of the castellated arcuate portion 110. Although the fan duct 84 is closed and latched along the lower split line with latches 140, the fan duct inner structure 64 is not separately restrained and can potentially be separated from the core engine frame 90, for example by high pressure air in the core compartment 66, which can potentially damage the fan duct 84 and allow high pressure gas to escape through an opening near the seal 118 interface.

FIGS. 3c and 4c illustrate the fan duct 84 in a closed and latched position. The castellated arcuate portion 110 is rotated into or out of the page by a mechanism explained below with reference to FIGS. 5a and 5b such that the castellated feature 114 engages, is located outwardly of, and overlaps the outwardly facing surface 126 of the hook 124.

Figure 4D:
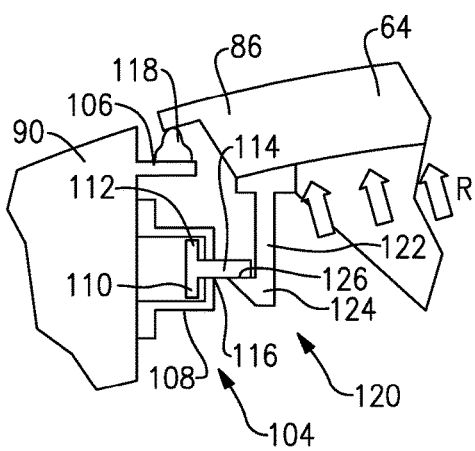
FIG. 4d illustrates the embodiment of the schematic latch mechanism when pressures attempts to move the fan duct away from an engine core.
Figure 5A:
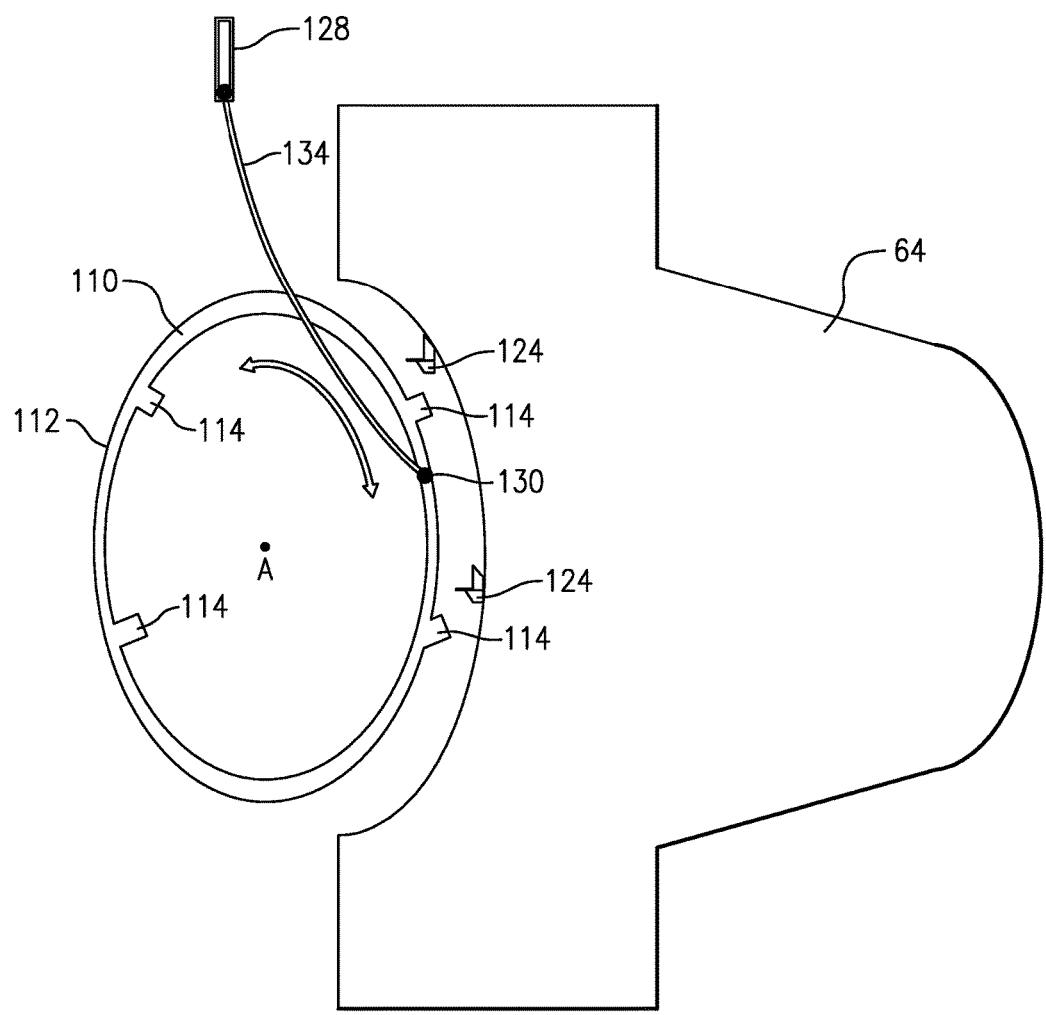
FIG. 5a illustrates an embodiment of a castellated arcuate portion rotated by a manually operated handle.
Figure 5B:
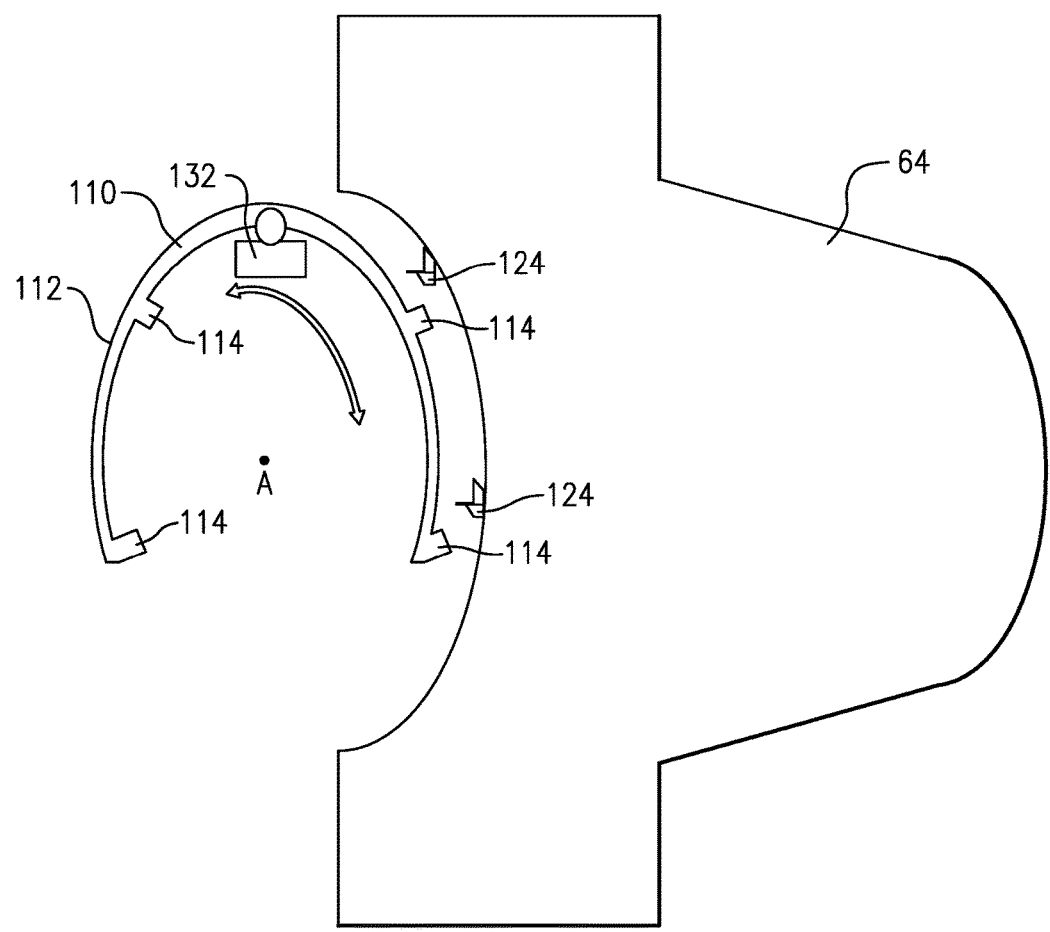
FIG. 5b illustrates another embodiment of a castellated arcuate portion rotated by a motor.

FIG. 4d illustrates the fan duct 84 during use of the gas turbine engine 20. High pressure air, potentially from a burst duct event, can cause the fan duct inner structure 64 to move outwardly in a direction R and away from the core engine frame 90. The outwardly facing surface 126 of the hook 124 engages the castellated feature 114 of the castellated arcuate portion 110, preventing the fan duct inner structure 64 from moving outwardly.

Although the castellated arcuate portion 110 is disclosed and illustrated as being mounted to the core engine frame 90, and the inwardly projecting retaining feature 120 is disclosed and illustrated as being part of the fan duct inner structure 64, it is possible that portions of the castellated arcuate portion 110 could be mounted to the fan duct inner structure 64, and the inwardly projecting retaining feature 120 can be part of the core engine frame 90.

Although the castellated arcuate portion 110 is disclosed and illustrated as being mounted to the core engine frame 90, and the fan duct 84 is disclosed and illustrated as rotating about the fan duct hinge line 86, it is possible that the fan duct 84 can translate axially along the engine central longitudinal axis A to the closed position.

In another example, the castellated arcuate portion 110 is static, and the hook 124 or a plurality of hooks 124 are located on an arcuate portion (not shown) to engage with a corresponding castellated feature 114 of the castellated arcuate portion 110. In one example, the arcuate portion including the hook 124 rotates about the engine central longitudinal axis A. In one example, the arcuate portion including the hook 124 can be rotated by a cable. In another example, each hook 124 rotates about a pivot axis to retain the castellated feature 114 of the castellated arcuate portion 110. In one example, each hook 124 rotates approximately 90° to engage the corresponding castellated feature 114.

FIGS. 5a and 5b illustrate the castellated arcuate portion 110 including at least one castellated feature 114. The castellated arcuate portion 110 is attached to the core engine frame 90 and is formed of a single component, which provides for higher reliability. In another embodiment, the castellated arcuate portion 110 can include multiple components, be a multi-piece assembly or include a series of individual pieces.

In the example of FIG. 5a, the castellated arcuate portion 110 extends 360° around the engine central longitudinal axis A and defines a circle or a ring. In this example, the castellated arcuate portion 110 is mounted to the core engine frame 90.

In the example of FIG. 5b, the castellated arcuate portion 110 extends less than 360° around the engine central longitudinal axis A. If the castellated arcuate portion 110 is mounted to the core engine frame 90, the castellated arcuate portion 110 can extend an amount greater than 0° to 360° around the engine central longitudinal axis A.

If the castellated arcuate portion 110 is mounted to the fan duct 84, the castellated arcuate portion 110 can be a multi-piece or a flexible assembly. In this example, one castellated arcuate portion 110 is associated with each half of the fan duct 84 and extends partially around the engine central longitudinal axis A (shown in FIG. 5b). Each castellated arcuate portion 110 can extend an amount greater than 0° to 180° around the engine central longitudinal axis A of each half of the fan duct 84.

Even though the castellated arcuate portion 110 as illustrated includes four castellated features 114, any number of castellated features 114 can be employed per fan duct 84 half. For example, the castellated arcuate portion 110 can include a single castellated feature 114 per fan duct 84 half.

FIG. 5a illustrates a castellated arcuate portion 110 that is rotated manually through actuation of a handle 128, such as a push/pull handle. A cable 134 is attached to the handle 128 and to the castellated arcuate portion 110 at a point 130 (shown schematically). When the handle 128 is manually actuated, the castellated arcuate portion 110 rotates about the engine central longitudinal axis A. The castellated feature 114 is located over the outwardly facing surface 126 of the hook 124 to lock and resist lifting of the fan duct inner structure 64. The handle 128 also interacts with the fan duct 84 to prevent closure of the fan duct 84 or fan cowl door (not shown) if not correctly engaged prior to flight.

FIG. 5b illustrates a castellated arcuate portion 110 that is rotated by a motor 132. The motor 132 can be an electrical motor, pneumatic motor, a fueldraulic motor or a hydraulic motor and gear, for example. If the motor 132 is a hydraulic motor and gear, hydraulic operation can be tied into a thrust reverser actuation system or a door opening system that is tied to ground cart operations and can be mounted behind an intermediate case fire wall (not shown). Actuation of the motor 132 rotates the castellated arcuate portion 110 about the engine central longitudinal axis A, aligning a castellated feature 114 over the outwardly facing surface 126 of the hook 124 to lock and resist lifting of the fan duct inner structure 64.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A gas turbine engine comprising:
a fan duct including a fan duct inner structure that surrounds a core engine;
a fan case that surrounds a fan;
a core engine frame; and
at least one mechanism configured to secure a portion of the fan duct inner structure to a portion of the core engine frame, wherein the at least one mechanism includes a castellated arcuate portion mounted to one of the fan duct inner structure and the core engine frame and an inwardly projecting retaining feature mounted to the other of the fan duct inner structure and the core engine frame;
wherein the fan duct inner structure is configured to pivot away from the core engine frame to a maintenance position about a hinge axis that is radially displaced from an engine central longitudinal axis; and
wherein the castellated arcuate portion is rotatable about the engine central longitudinal axis relative to the core engine frame to position a feature of the castellated arcuate portion proximate to a portion of the inwardly projecting retaining feature to latch the fan duct inner structure to the core engine frame in an operational position.

2. The gas turbine engine as recited in claim 1 wherein the castellated arcuate portion is mounted to the core engine frame and the inwardly projecting retaining feature is mounted to the fan duct inner structure.

3. The gas turbine engine as recited in claim 2 wherein the feature of the castellated arcuate portion is a tab, the inwardly projecting retaining feature includes an inwardly projecting stem and a hook having an outwardly facing surface, and the castellated arcuate portion is rotatable about the engine central longitudinal axis to position the tab outwardly of the outwardly facing surface of the hook to latch the fan duct inner structure.

4. The gas turbine engine as recited in claim 3 wherein when the fan duct inner structure is latched to the portion of the core engine frame, the hook abuts the tab and is situated radially inward of the tab.

5. The gas turbine engine as recited in claim 1 wherein the castellated arcuate portion is a single component.

6. The gas turbine engine as recited in claim 1 wherein the castellated arcuate portion extends 360° about the engine central longitudinal axis.

7. The gas turbine engine as recited in claim 1 including an additional castellated arcuate portion that also includes a feature that can be positioned to latch the fan duct inner structure, wherein each of the two castellated arcuate portions is associated with a respective half of the fan duct.

8. The gas turbine engine as recited in claim 1 wherein the castellated arcuate portion is manually rotatable.

9. The gas turbine engine as recited in claim 8 including a handle with a cable that is at least indirectly attached to the castellated arcuate portion, wherein actuation of the handle rotates the castellated arcuate portion about the engine central longitudinal axis.

10. The gas turbine engine as recited in claim 1 including a motor that is configured to rotate the castellated arcuate portion.

11. The gas turbine engine as recited in claim 1 wherein the castellated arcuate portion includes multiple components.

12. The gas turbine engine as recited in claim 1 wherein the castellated arcuate portion is situated aft of a fan of the gas turbine engine.

13. A gas turbine engine comprising:
a fan duct including a fan duct inner structure that surrounds a core engine;
a fan case that surrounds a fan;
a core engine frame; and
at least one mechanism configured to secure a portion of the fan duct inner structure to a portion of the core engine frame, wherein the at least one mechanism includes a castellated arcuate portion mounted to one of the fan duct inner structure and the core engine frame and an inwardly projecting retaining feature mounted to the other of the fan duct inner structure and the core engine frame,
wherein the castellated arcuate portion is rotatable about an engine central longitudinal axis to position a feature of the castellated arcuate portion proximate to a portion of the inwardly projecting retaining feature to latch the fan duct inner structure,
the gas turbine engine including a motor configured to rotate the castellated arcuate portion, wherein the motor is one of an electric motor, pneumatic motor, a fueldraulic motor, and a hydraulic motor.

14. A gas turbine engine comprising:
a fan duct including a fan duct inner structure that surrounds a core engine;
a fan case that surrounds a fan;
a core engine frame; and
at least one latch mechanism configured to secure a portion of the fan duct inner structure to a portion of core engine frame,
wherein the at least one latch mechanism includes a castellated arcuate portion mounted to the core engine frame and an inwardly projecting retaining feature mounted to the fan duct inner structure, wherein the inwardly projecting retaining feature includes a hook having an outwardly facing surface;
wherein the fan duct inner structure is configured to pivot away from the core engine frame to a maintenance position about a hinge axis that is radially displaced from an engine central longitudinal axis; and
wherein the castellated arcuate portion is rotatable about the engine central longitudinal axis relative to the core engine frame to position a castellated feature of the castellated arcuate portion outwardly of the outwardly facing surface of the hook to latch the fan duct inner structure to the core engine frame in an operational position, and the castellated feature is a tab.

15. The gas turbine engine as recited in claim 14 wherein the castellated arcuate portion extends 360° about the engine central longitudinal axis.

16. The gas turbine engine as recited in claim 14 including an additional castellated arcuate portion that also includes a castellated feature that can be positioned to latch the fan duct inner structure, wherein each of the two castellated arcuate portions is associated with a respective half of the fan duct.

17. The gas turbine engine as recited in claim 14 wherein the castellated arcuate portion is manually rotatable.

18. The gas turbine engine as recited in claim 17 including a handle with a cable that is at least indirectly attached to the castellated arcuate portion, wherein actuation of the handle rotates the castellated arcuate portion about the engine central longitudinal axis.

19. The gas turbine engine as recited in claim 14 including a motor that is configured to rotate the castellated arcuate portion.

20. The gas turbine engine as recited in claim 19 wherein the motor is one of an electric motor, pneumatic motor, a fueldraulic motor, and a hydraulic motor.

21. The gas turbine engine as recited in claim 14 wherein the castellated arcuate portion includes multiple components.

22. The gas turbine engine as recited in claim 14 wherein the castellated arcuate portion is situated aft of a fan of the gas turbine engine.

* * * * *